Feb. 22, 1949. J. A. MUELLER 2,462,276
SEEDER CONVEYER
Filed Dec. 6, 1946 2 Sheets-Sheet 2
Fig. 3.
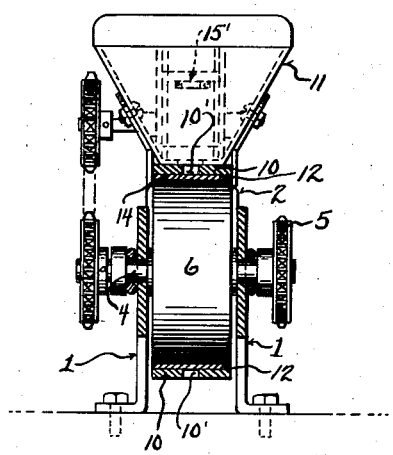
Fig. 4.
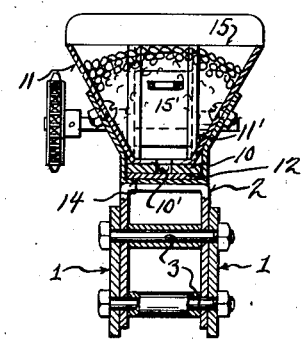
Fig. 5.
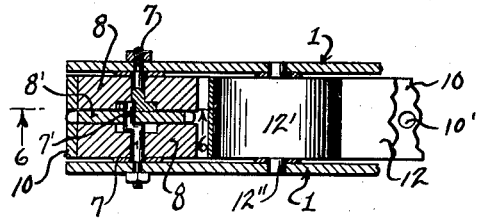
Fig. 6.
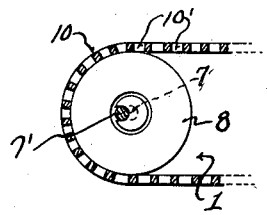
Fig. 8. Fig. 7.
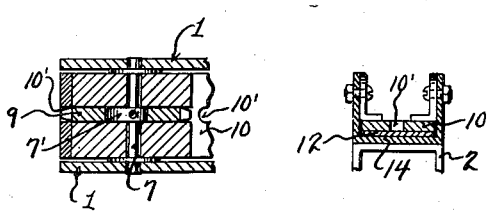
INVENTOR
JOHN A. MUELLER
BY
ATTORNEYS Patented Feb. 22, 1949

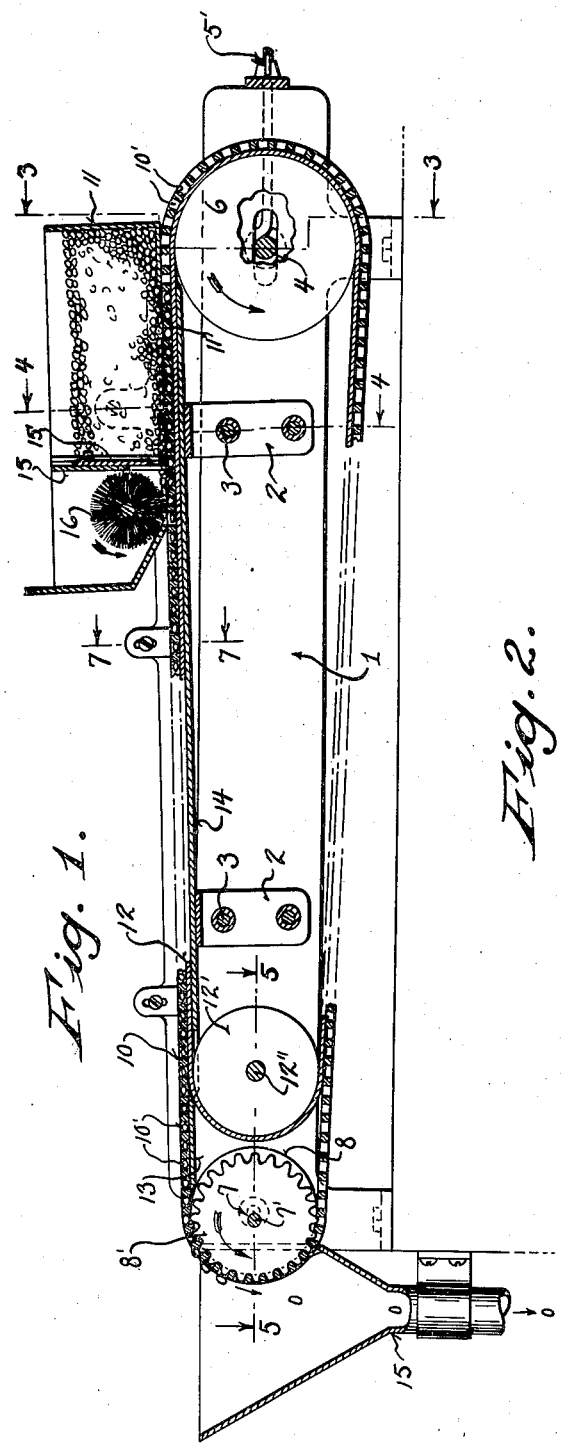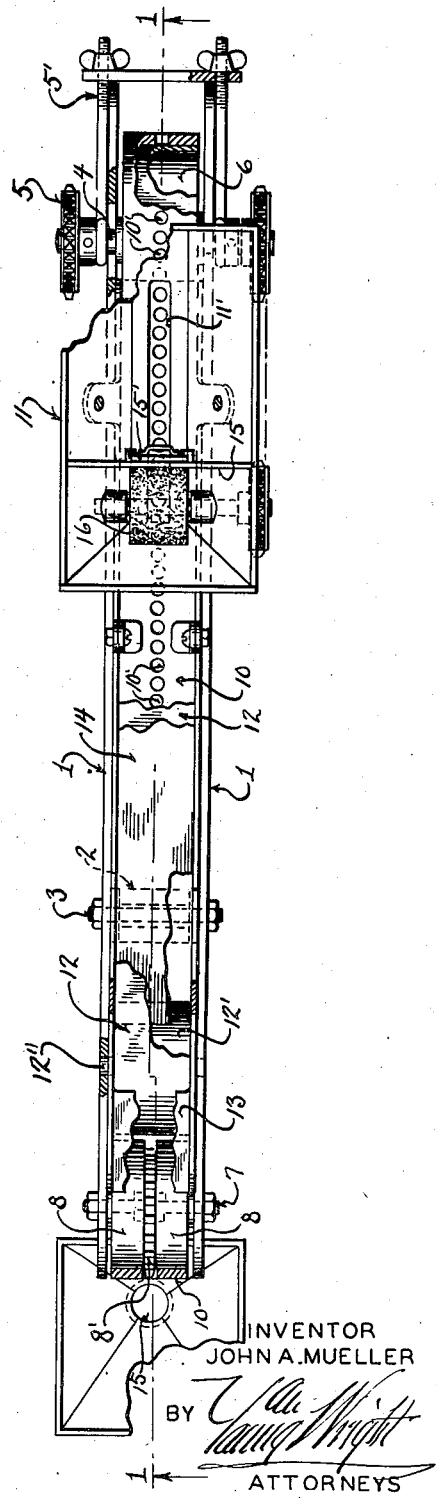

2,462,276

UNITED STATES PATENT OFFICE 2,462,276

SEEDER CONVEYER

John A. Mueller, Milwaukee, Wis.

Application December 6, 1946, Serial No. 714,624

2 Claims. (Cl. 198—30)

My invention refers to seeders and it has for its primary object to provide an endless driven belt having spaced seed receiving apertures therein and a sprocket wheel adapted to enter the apertures to expel therefrom the seeds one by one into a seeder boot. Thus the seeds so planted are spaced equal distances apart to insure proper uniform planting, resulting in a full crop without waste of seeds dropped in uneven bunches.

A further object of my invention is to provide the apertured belt with a closing element engaging the lower surface thereof and a seed ejecting sprocket at the end of the closing element, the teeth of which sprocket successively engage the belt apertures for ejecting said seed downwardly by gravity and at a tangent with reference to the sprocket wheel.

A further object of my invention is to provide an eccentric upon which the sprocket wheel rotates whereby the teeth of the same are so timed to eject the seed in a downward vertical direction at a tangent to said sprocket.

A further object of my invention is to provide an endless apron for engaging the bottom surface of the belt and the apron is driven at the same speed as the seeder belt whereby pockets are developed just prior to the discharge of the seed through engagement of the belt apertures by the teeth of the sprocket.

A further object of my invention is to provide drive and driven pulleys for the seeder belt, the driven pulley having also mounted thereon an endless apron, the said apron being provided with an idle pulley rearwardly disposed with reference to the idle pulley of the aforesaid seeder belt.

While the seeder is particularly shown only described for supplying single unit seeds it is understood that the seeder belt apertures may be of such dimensions as to receive a plurality of seeds in each pocket, under certain conditions.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 represents a sectional elevation of a seeder mechanism embodying the features of my invention, the section being indicated by line 1—1 of Figure 2.

Figure 2 is a plan view of the same with parts broken away and other parts in section to more clearly illustrate structural features.

Figure 3 is a cross section of the seeder, the section being indicated by line 3—3 of Figure 1.

Figure 4 is another cross sectional view through the seeder, the section being indicated by line 4—4 of Figure 1.

Figure 5 is a fragmentary sectional plan view of the discharge end of the seeder mechanism, the section being indicated by line 5—5 of Figure 1.

Figure 6 is a detailed sectional face view of the pulley mechanism at the discharge end of the device, the section being indicated by line 6—6 of Figure 5.

Figure 7 is a detailed cross sectional view through the feeder belt and associated parts, the section being indicated by line 7—7 of Figure 1.

Figure 8 is a modified form of an eccentric seed discharge sprocket wheel.

Referring by characters to the drawings, 1 indicates rectangular spaced plates of a frame mounted upon any type of seeder mechanism, not shown. The plates are connected by brackets 2 secured by bolts 3 and suitable spacing thimbles.

The seed receiving end of the frame has journaled therein a shaft 4 carrying a drive sprocket 5 and a pulley 6 between the frame plates, the shaft being provided with a suitable belt tightener 5'. The discharge end of the feeder has fixedly secured thereto a two part eccentric shaft 7, the eccentric element 7' of which is centrally disposed.

Loosely mounted upon the shaft ends is a split pulley 8—8 and between the inner faces thereof is fitted a sprocket wheel 8', which sprocket wheel is loosely rotatable upon the eccentric element 7' of the shaft 7.

Mounted upon the driven and idle split pulley is an endless belt 10 having seed receiving apertures 10' therein spaced apart at equal distances throughout the length of the belt for the reception of seed units. Mounted upon the frame at the receiving end of the belt is a hopper 11 which hopper is tapered downwardly and suitably secured to the frame, the same having a discharge slot 11' in its bottom wall as best shown in Figure 2 of the drawings.

The bottom of the hopper is positioned directly over the upper face of an apertured seeder belt 10 and the slot in the hopper bottom is in alinement with the belt apertures, as shown.

Also mounted upon the driven belt pulley 6 and directly under the belt 10, is an endless apron 12, the discharge end of which is mounted upon an idle roller 12' journaled upon a stud shaft 12" carried by the frame plates 1, the said roller being directly rearward of the split pulley 8.

The endless apron 12 travels at the same speed as the apertured belt and thus forms a closure for the said belt apertures whereby seed pockets are formed.

It will be noted that the upper peripheral space between the split roller 8 and the idle roller 12' is provided with an aperture closing strip 13 whereby seeds in the pocket are caused to travel towards and over the sprocket wheel 8'.

The apron 12 is guided and supported upon its working stretch by a longitudinally extended track plate 14, which plate is supported upon a bridge portion of the brackets 2.

The discharge end of the seeder has suitably secured thereto a boot 15 having a flared mouth disposed about the periphery of the split pulley and associated sprocket wheel.

As shown in Figure 8 of the drawings, the split belt pulley shaft 7 may be a single unit having an eccentric ring 7" adjustably secured thereto upon which eccentric ring the sprocket wheel 9 is mounted.

From the foregoing description it is obvious when the seeder belt is in motion, its upper working stretch will carry individual seeds in the series of pockets towards and upon the split pulley 8 and as said belt travels downwardly and over the pulley and associated sprocket wheel 8', it will be noted that the teeth of the sprocket, due to the sprocket eccentricity with reference to the pulley, will fully enter the belt apertures upon a horizontal plane intercepting the axis of the pulley shaft.

Hence, while the teeth will gradually mesh throughout the depth of the belt apertures as said sprocket rotates downwardly, it will completely eject the seeds one by one from their pockets while the belt is traveling through 90° to thus insure that each seed is dropped at the proper space interval and discharged into the boot whereby the said seed units will be planted uniformly.

As shown in the drawings, the hopper 11 is provided with a partition 15 spaced from the bottom to form a throat and said partition is provided with an adjustable plate 15' whereby the throat may be varied.

Mounted in the front chamber of the partition is a chain and sprocket driven rotatable brush 16, which brush enters the slot 11' and engages the upper surface of the belt 10 whereby surplus seed is swept from the face of the belt back into the seed hopper proper.

I claim:

1. A seeder comprising a frame, a hopper mounted thereon, pulleys mounted at the ends of the frame, an endless apertured belt mounted upon the pulleys, an endless apron mounted upon one of said belt pulleys and a second idle pulley, the apron engaging the under surface of the belt to form seed pockets, and a seeder ejector sprocket wheel eccentrically mounted with reference to one of the belt pulleys for engaging the belt apertures.

2. A seeder comprising a frame, a hopper mounted thereon, an endless apertured belt positioned under the hopper, a drive pulley for the belt, an idle split pulley for said belt, a sprocket wheel interposed between the split pulley parts, in mesh with the apertures of the belt, and an endless apron engaging the lower face of said belt mounted upon the driven belt pulley at one end and an idle pulley at the opposite end, positioned rearwardly of the split pulley.

JOHN A. MUELLER.

REFERENCES CITED

The following references are of record in the file of this patent:

UNITED STATES PATENTS

| Number | Name | Date |
|---|---|---|
| 2,152,107 | Thompson | Mar. 28, 1939 |
| 2,302,499 | Lacson | Nov. 17, 1942 |
| 2,307,415 | Malhiot | Jan. 5, 1943 |